US010116609B2

(12) United States Patent
Zink et al.

(10) Patent No.: US 10,116,609 B2
(45) Date of Patent: Oct. 30, 2018

(54) THIRD PARTY EMAIL SIGNATURE GENERATION AND AUTHENTICATION

(71) Applicant: MICROSOFT TECHNOLOGY LICENSING, LLC, Redmond, WA (US)

(72) Inventors: Terry Zink, Bellevue, WA (US); Mauktik Gandhi, Redmond, WA (US); Robert Herbst, Redmond, WA (US); Shashank Kavishwar, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 244 days.

(21) Appl. No.: 14/935,421

(22) Filed: Nov. 8, 2015

(65) Prior Publication Data
US 2017/0034100 A1 Feb. 2, 2017

Related U.S. Application Data

(60) Provisional application No. 62/199,170, filed on Jul. 30, 2015.

(51) Int. Cl.
*H04L 29/06* (2006.01)
*H04L 12/58* (2006.01)

(52) U.S. Cl.
CPC .............. *H04L 51/22* (2013.01); *H04L 51/12* (2013.01); *H04L 51/30* (2013.01); *H04L 63/123* (2013.01); *H04L 51/28* (2013.01)

(58) Field of Classification Search
CPC ................................ H04L 51/12; H04L 51/30
USPC ....................................................... 709/206
See application file for complete search history.

(56) References Cited

U.S. PATENT DOCUMENTS

| 6,986,049 | B2 | 1/2006 | Delany |
| 8,381,262 | B2 | 2/2013 | Risher et al. |
| 8,443,193 | B1 | 5/2013 | Dreymann et al. |
| 8,566,938 | B1 | 10/2013 | Prakash et al. |
| 8,799,482 | B1 | 8/2014 | Stamos |
| 8,856,525 | B2 | 10/2014 | Kaplan |
| 2005/0216587 | A1 | 9/2005 | John |
| 2008/0133672 | A1 | 6/2008 | Gillum |
| 2008/0256210 | A1 | 10/2008 | Malik |

(Continued)

FOREIGN PATENT DOCUMENTS

EP 2709046 A1 3/2014

OTHER PUBLICATIONS

Leiba, et al., "DomainKeys Identified Mail (DKIM):Using Digital Signatures for Domain Verification", In Proceedings of Fourth Conference on Email and Anti-Spam, Aug. 2, 2007, 6 pages.

(Continued)

*Primary Examiner* — Adnan Mirza
(74) *Attorney, Agent, or Firm* — Michael Best & Friedrich LLP (57) ABSTRACT

Technologies are described related to third party email signature generation and authentication. A DKIM signature may be stamped in a way such that the "From" address is encoded in the selector. The domain may be extracted from the DKIM signature based upon being from a known sender in the d=field, which signs on behalf of another domain. The reconstructed domain may be aligned from the selector against the actual domain in the "From" address to pass DMARC.

15 Claims, 6 Drawing Sheets

(56) References Cited

U.S. PATENT DOCUMENTS

| | | | |
|---|---|---|---|
| 2009/0216842 A1 | 8/2009 | Risher et al. | |
| 2009/0300768 A1* | 12/2009 | Krishnamurthy | G06F 21/552 726/26 |
| 2010/0299399 A1 | 11/2010 | Wanser et al. | |
| 2012/0167233 A1* | 6/2012 | Gillum | H04L 51/12 726/29 |
| 2014/0082726 A1 | 3/2014 | Dreller et al. | |

OTHER PUBLICATIONS

"SPF, DKIM, and DMARC Demystified", Retrieved on: Jul. 21, 2015, Available at: http://www.mcafee.com/in/resources/solution-briefs/sb-spf-dkim-dmarc-demystified.pdf.

Crocker, D. "Tailored Signatures with DOSETA", Published on: Apr. 26, 2011, Available at: http://www.w3.org/2011/identity-ws/papers/idbrowser2011_submission_1.pdf Aitchison, Ron, "DNS Technique", In Publisher of Pro DNS and BIND 10, Retrieved on: Jul. 21, 2015, 2 pages.

"Authenticate email with DKIM ", Published on: Dec. 6, 2013, Available at: https://support.google.com/a/answer/174124?hl=en.

"How to Set Up DMARC Email Authentication", Published on: Mar. 30, 2014, Available at: http://www.gettingemaildelivered.com/how-to-set-up-dmarc-email-authentication.

"Best Practices on Email Protection: SPF, DKIM and DMARC", Retrieved on: Jul. 21, 2015, Available at: https://wiki.zimbra.com/wiki/Best_Practices_on_Email_Protection:_SPF,_DKIM_and_DMARC.

Kucherawy, et al., "Domain-based Message Authentication, Reporting, and Conformance (DMARC)", Published on: Mar. 2015, Available at: http://tools.ietf.org/html/rfc7489.

"International Search Report and Written Opinion Issued in PCT Application No. PCT/US2016/044129", dated Nov. 9, 2016, 11 Pages.

"International Preliminary Report on Patentability Issued in PCT Application No. PCT/US2016/044129", dated Oct. 26, 2017, 6 Pages.

* cited by examiner

THIRD PARTY EMAIL SIGNATURE GENERATION AND AUTHENTICATION

CROSS-REFERENCE TO RELATED APPLICATIONS

This Application claims the benefit under 35 U.S.C. § 119(e) of U.S. Provisional Patent Application Ser. No. 62/199,170 filed on Jul. 30, 2015. The disclosure of the U.S. Provisional Patent Application is hereby incorporated by reference in its entirety.

BACKGROUND

Email spoofing, is commonly used in phishing emails and other malware propagation. Thus, by authenticating an email that it is actually from the address it claims to be from, a substantial number of these malicious or undesirable emails may be filtered. For example, Domain-Based Message Authentication, Reporting & Conformance (DMARC) is an industry standard that aligns (or matches) an organization domain address with either the domain which passes Sender Policy Framework (SPF), or the domain in the "d=field" of the Domain Keys Identified Mail (DKIM) signature which passes the DKIM, A DMARC selector pass may allow a third party to sign a DKIM signature on behalf of a sender, and then a receiver using the domain in the "d=field" and the selector "s=field" in the DKIM signature to produce a DMARC pass. Even though the domains may not align per the DMARC specification, the verifier may have enough information to infer a relationship between the DKIM signature and the domain in the "From" address and therefore pass DMARC. A failure to align may not fail DMARC, however.

However, DMARC based authentication involves a domain to publish DMARC records, set up SPF records, and set up DKIM records. This may be too complicated to do for some senders because many small and medium businesses (and even large businesses) may not be controllable setting up DNS records, and many may not even be aware of them.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to third party email signature generation and authentication. In some examples, a message may be received; a domain may be extracted from a signature of the received message based on the domain being in a domain field of the signature signed on behalf of another domain, where the other domain is a known domain; a reconstructed domain in a selector field of the signature may be aligned against an actual domain of the sender; the message may be authenticated based on the alignment; and the authenticated message may be forwarded to one or more recipients.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

As discussed above, the DKIM signature may be stamped in a way such that the "From" address is encoded in the selector. The domain may be extracted from the DKIM signature based upon being from a known sender in the d=field, which signs on behalf of another domain. The reconstructed domain may be aligned from the selector against the actual domain in the "From" address to pass DMARC.

In the following detailed description, references are made to the accompanying drawings that form a part thereof, and in which are shown by way of illustrations, specific embodiments, or examples. These aspects may be combined, other aspects may be utilized, and structural changes may be made without departing from the spirit or scope of the present disclosure. The following detailed description is therefore not to be taken in a limiting sense, and the scope of the present disclosure is defined by the appended claims and their equivalents.

While the embodiments will be described in the general context of program modules that execute in conjunction with an application program that runs on an operating system on a computing device, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multi-processor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable memory device includes a hardware device that includes a hard disk drive, a solid state drive, a compact disk, and a memory chip, among others. The computer-readable storage medium can for example be implemented via one or more of a volatile computer memory, a non-volatile memory, a hard drive, and a flash drive.

Throughout this specification, the term "platform" may be a combination of software and hardware components to provide an email service. Examples of platforms include, but are not limited to, a hosted service executed over a plurality of servers, an application executed on a single computing device, and comparable systems. The term "server" generally refers to a computing device executing one or more software programs typically in a networked environment. More detail on these technologies and example embodiments may be found in the following description.

The technical advantages of providing third party email signature generation and authentication may include, among others, increased security and efficiency communication exchange such as emails, reduced processing and network bandwidth usage (malicious or undesired emails being filtered at email service provider), and improved user interaction by allowing recipients to authenticate their emails without having to acquire knowledge or pay a third party to configure their DKIM and SPF settings.

Embodiments address a need that arises from very large scale of operations created by networked computing and cloud based services that cannot be managed by humans. The actions/operations described herein are not a mere use of a computer, but address results of a system that is a direct consequence of software used as a service such as task services offered in conjunction with the tasks.

Figure 1:
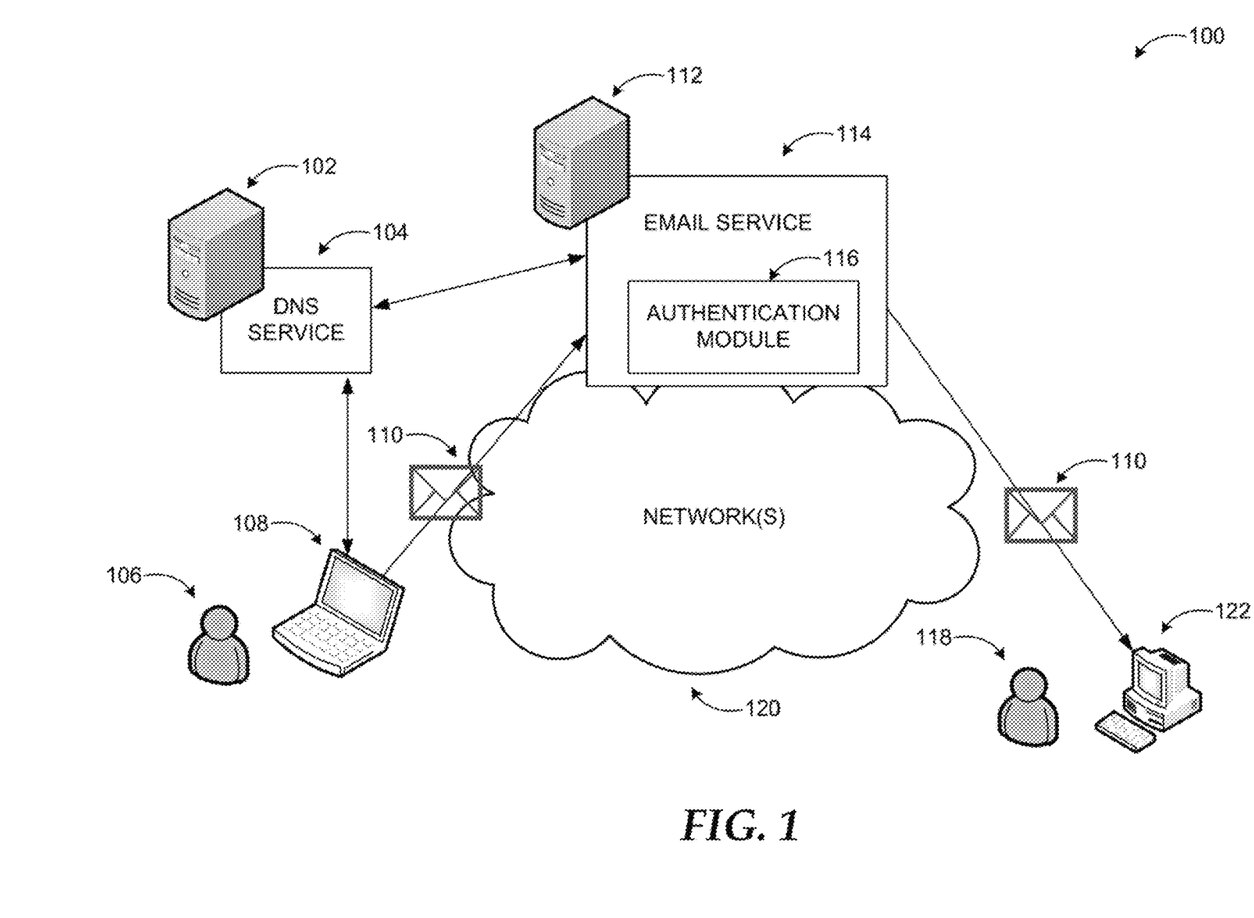
FIG. 1 illustrates conceptually the delivery of an email between two customers of the same email service according to embodiments.

FIG. 1 illustrates conceptually the delivery of an email between two customers of the same email service according to embodiments.

An email exchange between two users may be managed by an email service 114 as shown in diagram 100. In the example configuration of diagram 100, a sender 106 may access the email service 114 (executed on server 112) through a local client application executed on computing device 108 or a web browser to send an email 110 over network 120. The sender's email may be associated with domain managed by DNS service 104 executed on server 102.

The email 110 may be processed by authentication module 116 to authenticate the email address as belonging to the actual domain and not a spoofed one. The email may be delivered to recipient 118 through a local client application or a web browser executed on computing device 108. As mentioned previously, a DMARC system may involve the domain to publish DMARC records, set up SPF records, and set up DKIM records. If the domain passes through a hosted filtering service (e.g., email service 114) and the service signs a DKIM signature on the domain's behalf, and adds information into the DKIM signature, it may be possible to infer a relationship between the domain in the From: address and the DKIM signature. The domain may not pass DMARC, but the recipient may reasonably guess since the signature belongs to a known DKIM signer and the From: address is in encoded in the signature. In that scenario, it may be good enough to pass DMARC even if the domain has not published DMARC records.

Conventional approaches do not address domain owners not possessing expertise to set up DMARC, SPF, or DKIM records, and they are also typically rigid in their adherence to the DMARC specification. For example, the domain owner may be required to publish a DMARC, SPF, and/or DKIM record after they have registered a domain. This may involve the domain owners to have the necessary knowledge to set up and maintain DNS records. In another example, new domains may be required to have DMARC records. In yet another approach, known DMARC failures may be tracked internally and silently suppressed based upon complex filtering rules. A system according to embodiments checks for spooling explicitly and based upon a known pattern.

For an example domain contoso.com, a message may be sent as follows:

DKIM-Signature: s=1024; d=contoso.com
From: user@foo.contoso.com

If the domain foo.contoso.com (or even contoso.com) publishes a DMARC record, then since foo.contoso.com aligns with contoso.com, it may pass DMARC. However, this may require contoso.com to publish a DKIM record in DNS (or delegate it using a CNAME). If Contoso does not publish any DKIM record in DNS, or DMARC record, but their email flows through an email service provider according to embodiments, the email service provider may stamp a DKIM signature because it knows that the email originated out of that email service provider and knows it came from Contoso. In that scenario, the email header may look like:

DKIM-Signature: s=selector1-contoso-com; d=contoso.onemailserviceprovider.com
From: user@foo.contoso.com Because foo.contoso.com does not align with contoso.onemailserviceprovider.com, this may not pass DMARC. However, a relationship may be inferred between the DKIM signature signer and the domain in the From: address.

The email service 114 may affix the DKIM signature, where the selector is in form "selector1<domainGUID>". The domainGUID may take a domain and replace the dots with dashes, for example contoso.com may become contoso-com; foo.contoso.com may become foo-contoso-com, and so forth. This means that rather than using only the domain in the d=field of a DKIM signature to align with DMARC, receiver may use the combination of a d=containing *, onemailserviceprovider.com and the value in the selector s=.

s=selector1-contoso-com

In the address line, replacing the dots with dashes may yield "contoso-com". Removing the "selector1-" prefix in the s=yields contoso-com, which may match the domain the From: address. Now a relationship may be inferred because the email service provider (e.g., *. onemailserviceprovider.com) may generally stamp a message a certain way. The From: address may be encoded into the selector—this is called a DMARC selector pass. Thus, the message may be considered aligned for the purposes of DMARC and the domain in the From: address may be trusted, not because the domain has published the necessary SPF, DKIM, or DMARC records, but because the signer (email service provider) is known to transmit DKIM signatures on behalf of its customers in a known way.

DMARC results are usually stamped in the Authentication-Results header in a message. This may be indicated with the following string:

```
Authentication-Results: dmarc=selectorpass action=none
header.from=contoso.com
```

Thus, the part that changes is the "dmarc=selectorpass".

Figure 2:
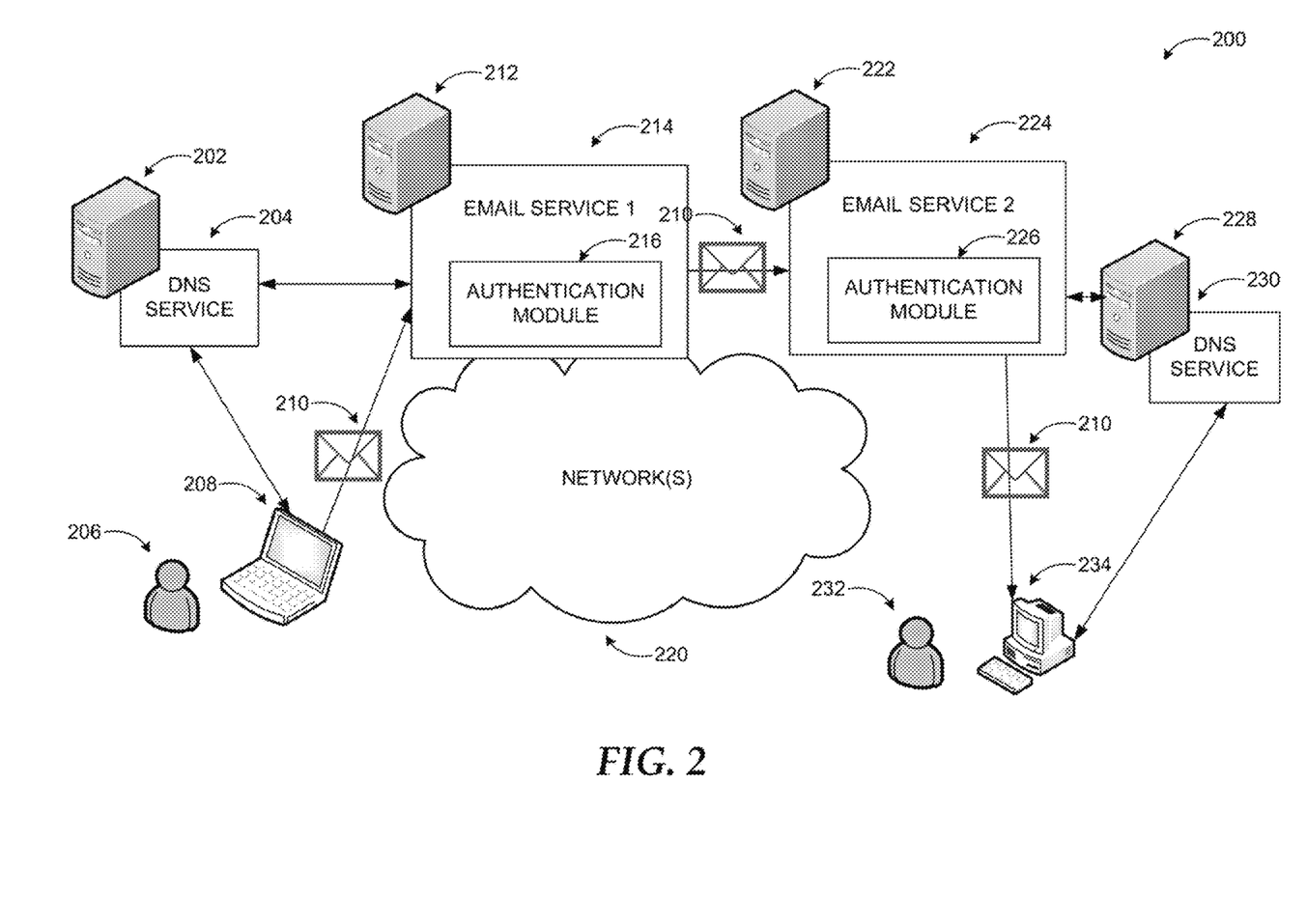
FIG. 2 illustrates conceptually the delivery of an email between two customers of two different email services according to embodiments.

FIG. 2 illustrates conceptually the delivery of an email between two customers of two different email services according to embodiments.

While emails between different customers of an email service provider may be authenticated through the same service provider using the principles described above, the authentication mechanism may be extended to emails between customers of different email service providers as shown in 200.

An email 210 may be sent by sender 206 through a client application executed on computing device 208 via email service 214 executed on server 212 associated with the sender 106 and via email service 224 executed on server 222 to recipient 232. The email service 224 may be the email service provider of the recipient 232 and be accessed by the recipient through a thick or thin client application (locally installed or browser) on computing device 234. The exchange may be over one or more networks 220. Sender 206 may be associated with a domain managed by DNS service 204 executed on server 202 and recipient 232 may be associated with a domain managed by DNS service 230 executed on server 228.

If the two email service providers (email services 214 and 224) indicate they are using the same approach to sign the emails on behalf of their customers (sender 206 and recipient 232), they may trust emails coming from each other. Furthermore, embodiments are not limited to emails. Other communication forms that use a comparable authentication approach may also be authenticated on behalf of the customers by the respective service providers.

Figure 3:
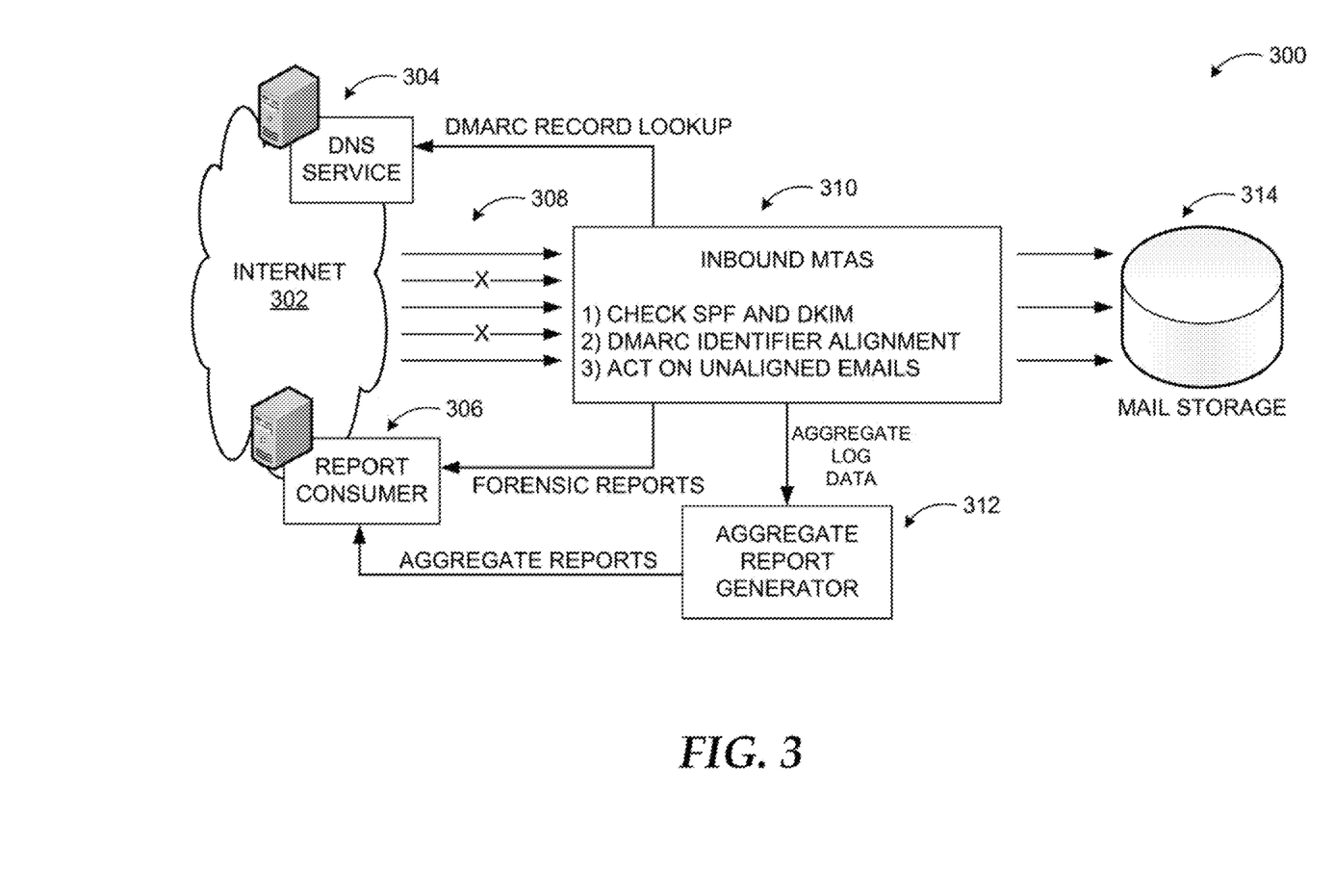
FIG. 3 illustrates an example DMARC process according to some embodiments.

FIG. 3 illustrates an example DMARC process in diagram 300.

In a system implementing DMARC, the domain From: address (the one that is received by the email client) is published to a DMARC record in DNS service 304. Inbound mail transfer agents (MTAs) 310 may be used for a three-layer process on incoming email 308, where SPF is passed (against the domain in the mail from field, not normally shown in a mail client) and/or DKIM is passed (defined in a DKIM signature header in the message headers). Next, the domain in the From: address may be checked to align with either the domain that passes SPF or the domain that passes DKIM (defined in the d=field). If a message passes all three, then it may be considered as passing DMARC as not being spoofed and forwarded to mail storage 314.

In some embodiments, an aggregate report generator 312 may receive aggregate log data based on the three-layer check process performed at the inbound MTAs and provide aggregate reports to a report consumer 306. The report consumer 306 may also receive forensic reports associated with the check process. The report consumer 306 may be another entity such as a certification service, an analysis service, a security service, an email service provider, and comparable ones.

The example scenarios and schemas in FIG. 1 through 3 are shown with specific components, data types, and configurations. Embodiments are not limited to systems according to these example configurations. Third party email signature generation and authentication may be implemented in configurations employing fewer or additional components in applications and user interfaces. Furthermore, the example schema and components shown in FIG. 1 through 3 and their subcomponents may be implemented in a similar manner with other values using the principles described herein.

Figure 4:
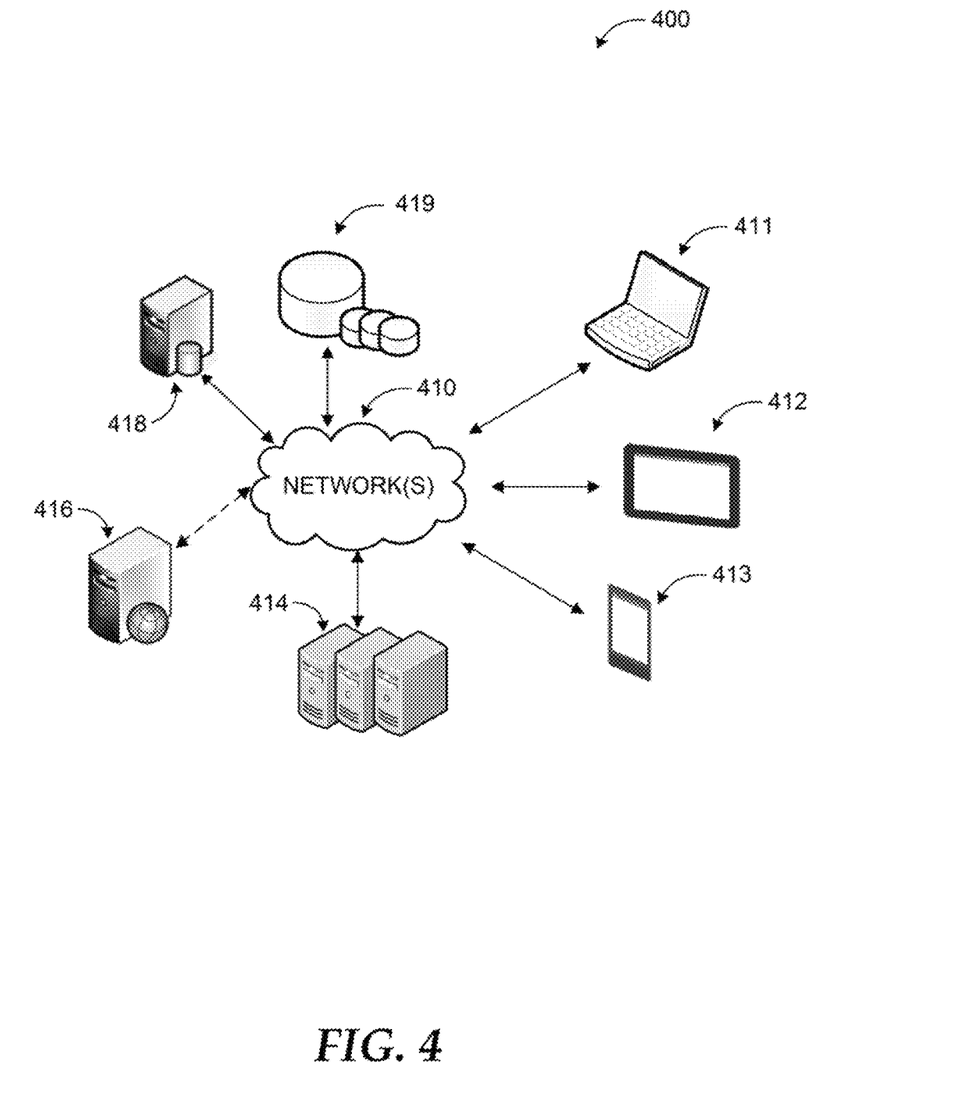
FIG. 4 is an example networked environment, arranged in accordance with at least some embodiments described herein.

FIG. 4 is an example networked environment, where embodiments may be implemented.

As shown in a diagram 400, a communication service providing email and other communication services may be implemented in a networked environment over one or more networks such as network 410. Users may access the emails and other communication services) through locally installed or thin (e.g., browse client applications executed on a variety of computing devices. In case of emails, the communication service may stamp the DKIM signature in a way such that the "From" address is encoded in the selector. The domain may be extracted from the DKIM signature based upon being from a known sender in the d=field, which signs on behalf of another domain. The reconstructed domain may be aligned from the selector against the actual domain in the "From" address to pass DMARC.

A communication service, as discussed herein, may be implemented via software executed over servers 414. The servers 414 may include one or more processing servers 416, where at least one of the one or more processing servers 416 may be configured to execute one or more applications associated with the communication service. In other examples, the communication service may be provided by a third party service or may include a web application. The communication service may store data associated with data in a data store 119 directly or through a database server 418.

The network 410 may comprise any topology of servers, clients, Internet service providers, and communication media. A system according to embodiments may have a static or dynamic topology. The network 410 may include multiple secure networks, such as an enterprise network, an unsecure network, or the Internet. The unsecure network may include a wireless open network. The network 410 may also coordinate communication over other networks, such as Public Switched Telephone Network (PSTN) or cellular networks. Furthermore, the network 410 may include multiple short-range wireless networks, such as Bluetooth, or similar ones. The network 410 may provide communication between the nodes described herein. By way of example, and not limitation, the network 410 may include wireless media. The wireless media may include, among others, acoustic media, RF media, infrared media, and other wireless media.

Many other configurations of the computing devices, the applications, the data sources, and the data distribution systems may be employed to provide third party email signature generation and authentication. Furthermore, the networked environments discussed in FIG. 4 are for illustration purposes only. Embodiments are not limited to the example applications, modules, or processes.

Figure 5:
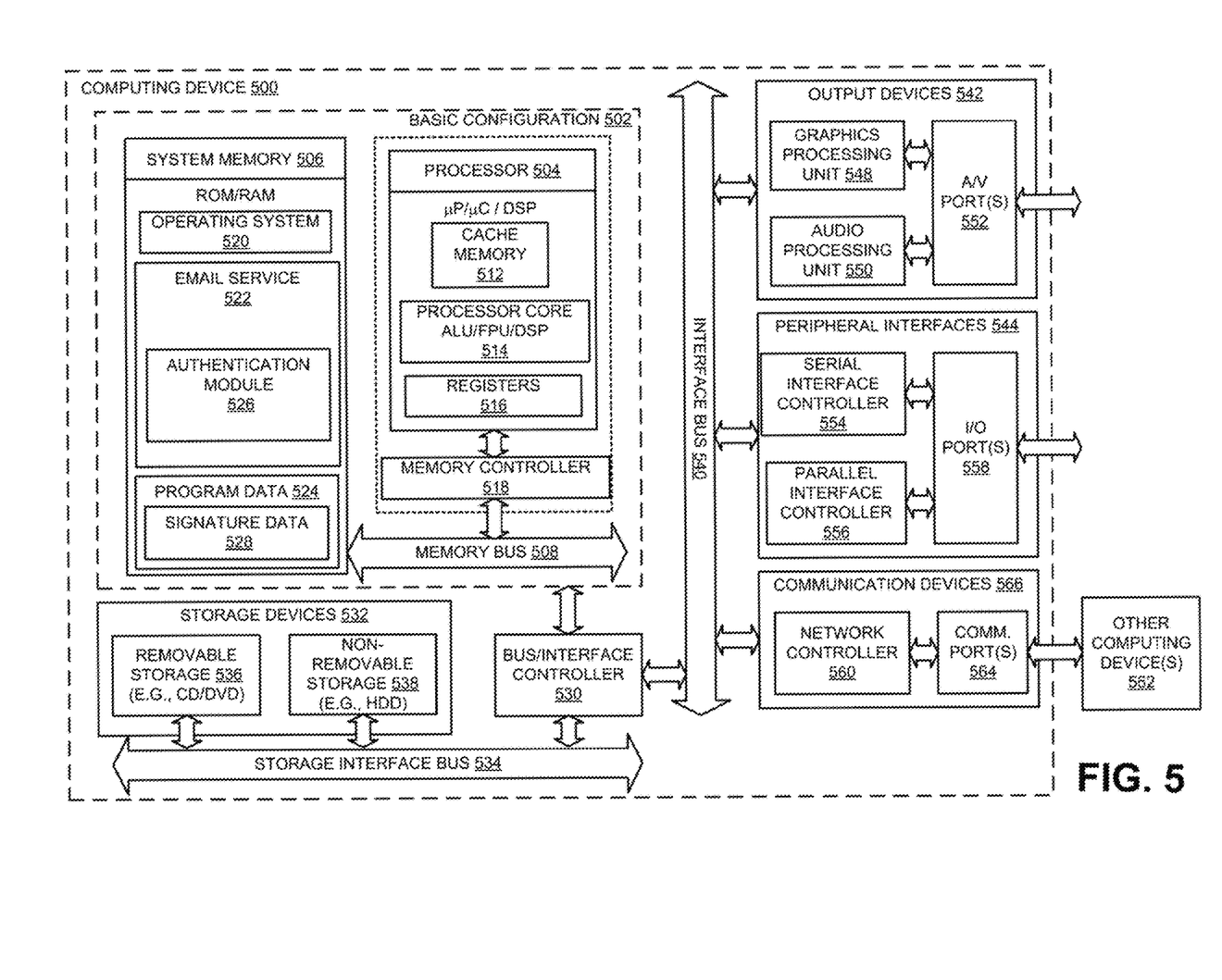
FIG. 5 illustrates a general purpose computing device, which may be configured to provide third party email signature generation and authentication, arranged in accordance with at least some embodiments described herein.

FIG. 5 illustrates a general purpose computing device, which may be configured to provide third party email signature generation and authentication, arranged in accordance with at least some embodiments described herein.

For example, a computing device 500 may be a server used to provide an email service, as discussed herein. In an example of a basic configuration 502, the computing device 500 may include a processor 504 and a system memory 506. The processor 504 may include multiple processors. A memory bus 508 may be used for communication between the processor 504 and the system memory 506. The basic configuration 502 may be illustrated in FIG. 5 by those components within the inner dashed line.

Depending on the desired configuration, the processor 504 may be of any type, including, but not limited to, a microprocessor (μP) a microcontroller (μC), a digital signal processor (DSP), or any combination thereof. The processor 504 may include one more levels of caching, such as a level 1 cache memory 512, a processor cure 514, and registers 516. The processor core 514 may include an arithmetic logic unit (ALU), a floating point unit (FPU), a digital signal processing core (DSP Core), or any combination thereof. A memory controller 518 may also be used with the processor 504, or in some implementations, the memory controller 518 may be an internal part of the processor 504.

Depending on the desired configuration, the system memory 506 may be of any type including but not limited to volatile memory (such as RAM), non-volatile memory (such as ROM, flash memory, etc.), or any combination thereof. The system memory 506 may include an operating system 520, an email service 522, and program data 524. The email service 522 may include an authentication module 526, which may provide third party email signature generation and authentication. Program data 524 may include, among others, signature data 528.

The computing device 500 may have additional features or functionality, and additional interfaces to facilitate communications between the basic configuration 502 and any desired devices and interfaces. For example, a bus/interface controller 530 may be used to facilitate communications between the basic configuration 502 and data storage devices 532 via a storage interface bus 534. The data storage devices 532 may be removable storage devices 536, non-removable storage devices 538, or a combination thereof. Examples of the removable storage and the non-removable storage devices may include magnetic disk devices, such as flexible disk drives and hard-disk drives (HDD), optical disk drives such as compact disk (CD) drives or digital versatile disk (DVD) drives, solid state drives (SSD), and tape drives, to name a few. Example computer storage media may include volatile and nonvolatile, removable, and non-removable media implemented in any method or technology for storage of information, such as computer-readable instructions, data structures, program modules, or other data.

The system memory 506, the removable storage devices 536, and the non-removable storage devices 538 may be examples of computer storage media. Computer storage media may include, but may not be limited to, RAM, ROM, EEPROM, flash memory or other memory technology, CD-ROM, digital versatile disks (DVD), solid state drives, or other optical storage, magnetic cassettes, magnetic tape, magnetic disk storage or other magnetic storage devices, or any other medium which may be used to store the desired information and which may be accessed by the computing device 500. Any such computer storage media may be part of the computing device 500.

The computing device 500 may also include an interface bus 540 for facilitating communication from various interface devices (for example, one or more output devices 542, one or more peripheral interfaces 544, and one or more communication devices 566) to the basic configuration 502 via the bus/interface controller 530. The one or more output devices 542 may include a graphics processing unit 548 and an audio processing unit 550, which may be configured to communicate to various external devices, such as a display or speakers via one or more A/V ports 552. The one or more peripheral interfaces 544 may include a serial interface controller 554 or a parallel interface controller 556, which may be configured to communicate with external devices, such as input devices (for example, keyboard, mouse, pen, voice input device, touch input device, etc.) or other peripheral devices (for example, printer, scanner, etc.) via one or more I/O ports 558. The one or more communication devices 566 may include a network controller 560, which may be arranged to facilitate communications with one or more other computing devices 562 over a network communication link via one or more communication ports 564. The one or more other computing devices 562 may include servers, client equipment, and comparable devices.

The network communication link may be one example of a communication media. Communication media may be embodied by computer-readable instructions, data structures, program modules, or other data in a modulated data signal, such as a carrier wave or other transport mechanism, and may include any information delivery media. A "modulated data signal" may be a signal that has one or more of the modulated data signal characteristics set or changed in such a manner as to encode information in the signal. By way of example, and not limitation, communication media may include wired media such as a wired network or direct-wired connection, and wireless media such as acoustic, radio frequency (RF), microwave, infrared (IR), and other wireless media. The term computer-readable media, as used herein, may include both storage media and communication media.

The computing device 500 may be implemented as a part of a general purpose or specialized server, mainframe, or similar computer, which includes any of the above functions. The computing device 500 may also be implemented as a personal computer including both laptop computer and non-laptop computer configurations.

Example embodiments may also include methods to provide third party email signature generation and authentication. These methods may be implemented in any number of ways, including the structures described herein. One such way may be by machine operations, using devices of the type described in the present disclosure. Another optional way may be for one or more of the individual operations of the methods to be performed in conjunction with one or more human operators performing some of the operations while other operations may be performed by machines. These human operators need not be co-located with each other, but each may be with a machine that performs a portion of the program. In other examples, the human interaction may be automated such as by pre-selected criteria that may be machine automated.

Figure 6:
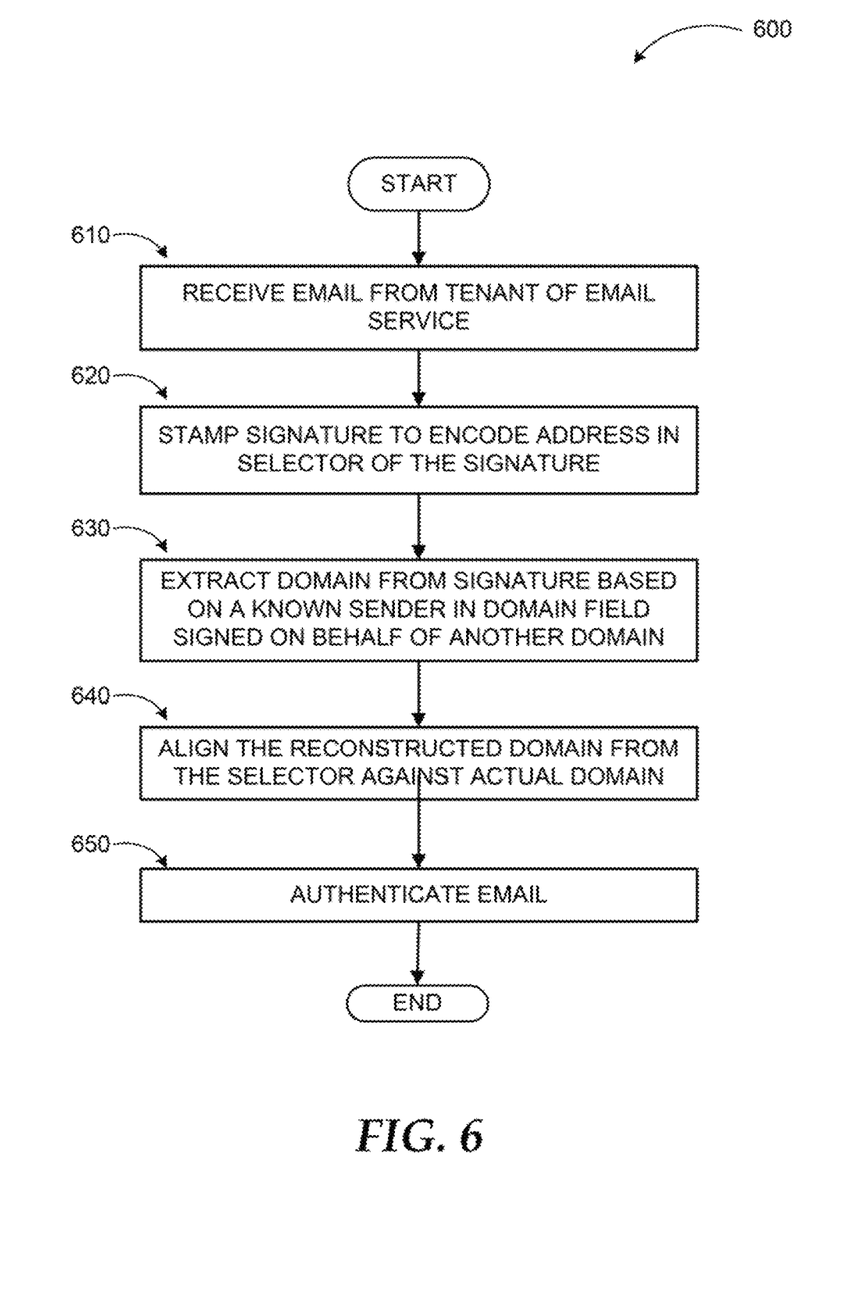
FIG. 6 illustrates a logic flow diagram for an example process to provide third party email signature generation and authentication, arranged in accordance with at least some embodiments described herein.

FIG. 6 illustrates a logic flow diagram for an example process to provide third party email signature generation and authentication, arranged in accordance with at least some embodiments described herein.

A process 600 may be implemented by an email service and/or its components, where the components may be executed on one or more sewers or other computing devices.

A process to provide third party email signature generation and authentication may begin with operation 610, where an authentication module of an email service may receive an email from a tenant of the email service. The authentication module may stamp a signature of the email to encode a sender address in a selector field of the signature at operation 620. For a received email, a domain may be extracted by the authentication module from the signature based on the domain being a known sender being in a domain field of the signature signed on behalf of another domain at operation 630. A reconstructed domain in the selector field may be aligned against an actual domain of the sender at operation 640, and the email authenticated at operation 650 based on the alignment results.

The operations included in process 600 are for illustration purposes. An email service to provide third party email signature generation and authentication, according to embodiments, may be implemented by similar processes with fewer or additional steps, as well as in different order of operations using the principles described herein. The operations described herein may be executed by one or more processors operated on one or more computing devices, one or more processor cores, specialized processing devices, and/or general purpose processors, among other examples.

According to examples, a means for providing third party email signature generation and authentication is described. The means may include a means for receiving a message; a means for extracting a domain from a signature of the received message based on the domain being in a domain field of the signature signed on behalf of another domain, where the other domain is a known domain; a means for aligning a reconstructed domain in a selector field of the signature against an actual domain of the sender; a means for authenticating the message based on the alignment; and a means for forwarding the authenticated message to one or more recipients.

According to some examples, a computing device to provide third party email signature generation and authentication is described. An example computing device may include a memory and one or more processors coupled to the memory, the one or more processors executing a communication application in conjunction with instructions stored in the memory. The communication application may include a message processing module configured to receive a message; provide the message to an authentication module; and if the message is authenticated by the authentication module, forward to one or more recipients. The communication application may also include the authentication module configured to extract a domain from a signature of the received message based on the domain being in a domain field of the signature signed on behalf of another domain, where the other domain is a known domain; align a reconstructed domain in a selector field of the signature against an actual domain of the sender; and authenticate the message based on the alignment.

According to other examples, the communication application may further include an aggregate report generator configured to receive aggregate log data and provide aggregate reports to one or more report consumers based on the received aggregate log data. The one or more report consumers may include a certification service, an analysis service, a security service, or an email service provider. The authentication module may be configured to extract the domain from a "d" field of the signature, and the signature is a Domain Keys Identified Mail (DKIM) signature according to a Domain-Based Message Authentication, Reporting and Conformance (DMARC) standard.

According to further examples, the DKIM signature may not be published in a domain name service. The reconstructed domain may be obtained as a result of an inference of a relationship between a signer of the DKIM signature and the domain of the message. The selector field of the DKIM signature may include the actual domain of the message with periods in the domain replaced by dashes. The communication application may be part of an email service provider. The email service provider may be known to transmit signatures on behalf of its customers in a known way.

According to other examples, a method executed at one or more computing devices to provide third party email signature generation and authentication is described. The method may include receiving a message; extracting a domain from a signature of received message based on the domain being in a domain field of the signature signed on behalf of another domain, where the other domain is a known domain; aligning a reconstructed domain in a selector field of the signature against an actual domain of the sender; authenticating the message based on the alignment; and forwarding the authenticated message to one or more recipients.

According to some examples, the method may also include extracting the domain from a "d" field of the signature, where the signature is a Domain Keys Identified Mail (DKIM) signature according to a Domain-Based Message Authentication, Reporting and Conformance (DMARC) standard. The method may further include stamping results of DMARC check in an authentication results header of the message and/or considering the message as passing the DMARC check and the domain of the message as a trusted domain with un-published SPF, DKIM, and DMARC records based on email service provider that has generated the signature being known to transmit DKIM signatures on behalf of its customers in a known way.

According to other examples, the email service provider may manage the message for a sender of the message and a recipient of the message. The method may further include inferring of a relationship between a signer of the DKIM signature and the domain of the message. The email service provider may also manage the message for a recipient of the message and another email service provider generates the signature of the message for a sender of the message. The other email service provider may be known to transmit signatures on behalf of its customers in a known way to the email service provider. The method may also include generating an aggregate report based on email authentication check results and providing the aggregate report to a report consumer application.

According to further examples, a method executed at one or more computing devices to provide third party email signature generation and authentication is described. The method may include receiving a message from a sender; stamping a signature of the message to encode a sender address in a selector field of the signature such that a domain is extracted from the signature of the message based on the domain being in a domain field of the signature signed on behalf of another known domain and the message authenticated based on an alignment of a reconstructed domain in a selector field of the signature against an actual domain of the sender at a recipient authentication module; and forwarding the message to one or more recipients.

According to yet other examples, the method may further include replacing periods in the domain with dashes in the selector field of the signature.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A computing device to provide third party email signature generation and authentication, the computing device comprising:
   a memory;
   one or more processors coupled to the memory, the one or more processors executing a first email service in conjunction with instructions stored in the memory, wherein the one or more processors are configured to:

receive a message from a sender through a second email service executed on a server associated with the sender, wherein
　the second email service is an email service provider of the sender,
　a signature of the message is stamped by the second email service to encode a selector field with a conversion of sender's domain address and a domain field with a combination of a known portion of the sender's domain address and the second email service's domain address,
　the second email service is known to stamp signatures of messages based on the conversion in the selector field, and the sender's domain address is not published;
align the sender's domain address with the known portion of the sender's domain address; and
authenticate the message based on the alignment.

2. The computing device of claim 1, wherein the one or more processors are further configured to receive aggregate log data and provide aggregate reports to one or more report consumers based on the received aggregate log data.

3. The computing device of claim 2, wherein the one or more report consumers include a certification service, an analysis service, a security service, or an email service provider.

4. The computing device of claim 1, wherein the signature is a Domain Keys Identified Mail (DKIM) signature according to a Domain-Based Message Authentication, Reporting and Conformance (DMARC) standard.

5. The computing device of claim 4, wherein the DKIM signature is not published in a domain name service.

6. The computing device of claim 4, wherein the sender's domain address is obtained as a result of an inference of a relationship between a signer of the DKIM signature and the sender's domain address.

7. The computing device of claim 4, wherein the selector field of the DKIM signature includes the sender's domain address with periods in the sender's domain address replaced by dashes.

8. The computing device of claim 1, wherein the first email service is an email service provider of a recipient of the message.

9. A method executed at one or more computing devices to provide third party email signature generation and authentication, the method comprising:
receiving, at a first email service, a message from a sender through a second email service executed on a server associated with the sender, wherein
　the first email service is an email service provider of a recipient,
　the second email service is an email service provider of the sender,
　a signature of the message is stamped by the second email service to encode a selector field with a conversion of sender's domain address and a domain field with a combination of a known portion of the sender's domain address and the second email service's domain address,
　the second email service is known to stamp signatures of messages based on the conversion in the selector field, and
　the sender's domain address is not published;
aligning the sender's domain address with the known portion of the sender's domain address;
authenticating the message based on the alignment; and
forwarding the authenticated message to the recipient.

10. The method of claim 9, wherein the signature is a Domain Keys Identified Mail (DKIM) signature according to a Domain-Based Message Authentication, Reporting and Conformance (DMARC) standard.

11. The method of claim 10, further comprising:
stamping results of DMARC check in an authentication results header of the message.

12. The method of claim 11, further comprising:
considering the message as passing the DMARC check and the sender's domain address of the message as a trusted domain with un-published SPF, DKIM, and DMARC records based on the second email service being known to transmit DKIM signatures on behalf of its customers in a known way.

13. The method of claim 12, wherein the first email service and the second email service are integrated.

14. The method of claim 10, further comprising:
inferring of a relationship between a signer of the DKIM signature and the sender's domain address of the message.

15. The method of claim 9, further comprising:
generating an aggregate report based on email authentication check results; and
providing the aggregate report to a report consumer application.

* * * * *